Nov. 5, 1963  J. M. SLATER  3,109,310
AUTOLUBRICATED FLUID BEARING FORCE MEASURING INSTRUMENT
Filed Nov. 20, 1957  4 Sheets-Sheet 1

INVENTOR.
JOHN M. SLATER
BY  Noel H Conway
AGENT

Nov. 5, 1963     J. M. SLATER     3,109,310
AUTOLUBRICATED FLUID BEARING FORCE MEASURING INSTRUMENT
Filed Nov. 20, 1957     4 Sheets-Sheet 3

INVENTOR.
JOHN M. SLATER
BY
Noel G Conway
AGENT

Nov. 5, 1963　　　　　J. M. SLATER　　　3,109,310
AUTOLUBRICATED FLUID BEARING FORCE MEASURING INSTRUMENT
Filed Nov. 20, 1957　　　　　　　　　　　　　　4 Sheets-Sheet 4

INVENTOR.
JOHN M. SLATER
BY *Noel S. Conway*
AGENT

United States Patent Office 3,109,310
Patented Nov. 5, 1963

3,109,310
AUTOLUBRICATED FLUID BEARING FORCE
MEASURING INSTRUMENT
John M. Slater, Fullerton, Calif., assignor to
North American Aviation, Inc.
Filed Nov. 20, 1957, Ser. No. 697,731
18 Claims. (Cl. 73—516)

This invention deals with a means for measuring forces. This invention also deals with a means for measuring forces along a single axis no matter how much the means is vibrated by its environment.

More specifically, this invention deals with an accelerometer in which the proof mass, that is the movable mass which is subject to the acceleration to be measured, is mounted upon a frictionless sleeve.

As is known, the first integral of acceleration with respect to time is velocity and the second integral is distance displacement, assuming that proper compensation for the acceleration of gravity and other disturbing accelerations has been made. Therefore, instruments are provided in inertial guidance systems which use this fact in determining the velocity and distance traveled in any particular direction. A serious problem exists in that the acceleration forces must be measured extremely accurately in spite of the high vibration and high "g" loading which accompanies missile take-off and flight. If all of the vibration were along only one axis it could be compensated for more easily; however, the vibrational forces appear in all axes and in instruments of pivotal support or pendulous type the proof mass is sometimes turned from its designed position. In such cases, the instrument responds to acceleration components along axes other than the sensing axis of the instrument. This error which is called cross-coupling can be a serious error in measurements made in high acceleration missiles. For example, in the case of a pendulous type instrument which is deflected 0.01 radian from null, there would be a 0.2 "g" error with a 20 "g" acceleration in a direction normal to the sensing axis or 1% error. There has been no very simple way to eliminate cross-coupling prior to the present invention. In certain instruments the effect is minimized by holding the pendulous element very close to null (within 0.001 radian or less) by a tight servo system, but this introduces a critical and difficult servo problem. The present invention provides a simple, rugged means of measuring forces which has no cross-coupling problem.

Further, changes in the operating temperature around the accelerometer tends to cause errors in many types of accelerometers which use liquids or springs in their theory of operation. The present invention is relatively insensitive to temperature, as its scale factor is determined mechanically simply by the mass of the movable element.

One object of this invention is to provide an instrument which will measure forces.

Another object of this invention is to provide an instrument which will measure forces along a single axis.

Another object of this invention is to provide an accelerometer which will measure inertial forces along a single invariable axis.

Still another object is to provide an accelerometer which is not susceptible to error due to temperature changes during the operation.

A further object of this invention is to provide an accelerometer which eliminates cross-coupling with its inherent errors.

A still further object of this invention is to provide an accelerometer which measures acceleration along a single axis no matter what the forces due to vibration of the instrument are.

Other and further objects of the invention will become apparent in the detailed description below, wherein.

The specific embodiments described below are primarily designed for measuring acceleration forces; however, it is seen that the instrument could be used to measure any force applied to the force measured receiving assembly.

Figure 1:
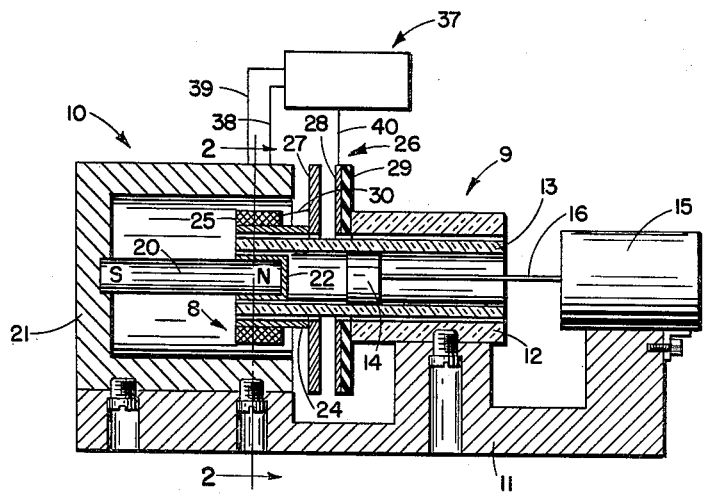
FIG. 1 is a sectional view along the longitudinal axis of the force measuring structure in one possible form.

As shown in FIG. 1, generally speaking the preferred form of the accelerometer is composed of the force receiving assembly or proof mass assembly 8 which includes coil 25 which is mounted on sleeve 24 and is rotatably and slidably mounted on the very smooth rotating spindle 13 of an auto-lubricating fluid bearing with a portion of the assembly 8 within the radial magnetic field of the magnetic stator 10. Means are provided to restrain the assembly 8 from rotating with the spindle but will allow the assembly 8 to move axially along the spindle and output means are provided which produce an output which is a function of the position of the assembly 8 on the spindle longitudinally thereof and the force required to hold it there.

More specifically, the structure of the instrument is mounted on frame 11 which may be of any shape to fit on the gyroscopically stabilized platform or other base on which the instrument is to be carried. The operating parts of the instrument are immersed in a gas or liquid (serving as the lubricant); if the fluid is anything but ordinary air, or if liquid is used, an enclosure will be provided around the rotating assembly. Journal 12 of the bearing referred to generally by arrow 9 is mounted on the frame 11 and in this modification is constructed of glass but can be constructed of some other material such as metal or plastic which could be produced with a relatively smooth inside surface for the auto-lubricating properties desired in the invention. Bearing spindle 13 is mounted within journal 12 and has been constructed successfully of a glass tube which is graphite coated to make the surface conductive and thereby avoid static-electricity forces. With this construction, rotating means such as motor 15 causes relative rotation between the assembly 8 and the spindle 13 by applying torque through wire 16 to disc 14 which is secured to spindle 13. The motor 15 may be of either D.-C. or A.-C. variety and the exact speed of the motor is not critical. In the device which has been used, a motor speed of 4,000 to 5,000 r.p.m. was found to be satisfactory in a fluid such as air. If the accelerometer were used in a fluid such as oil, the rotation could be reduced to a few r.p.m. and obtain the auto-lubrication desired. As misalignment of the equipment might be a problem, wire 16 was provided as a connecting member between the driving and driven elements to allow for any such misalignment.

The so-called autolubricated hydrodynamic bearing as employed in the apparatus operates by viscous drag effects in a manner well known in itself. Thus, if the force receiving assembly 8 moves down under the influence of gravity, its axis becomes eccentric relative to that of the spindle 13, forming a wedge-shaped gap. When the two elements are rotated relative to each other, the fluid (gas or liquid) is drawn into this gap by viscosity, generating a pressure on the gap to "float" the assembly. For details of theory and operation of this type of bearing, reference is made to the paper by G. W. K. Ford et al., "Principles and Applications of Hydrodynamic-Type Gas Bearings," presented October 26, 1956, at The Institution of Mechanical Engineers, London, and published by the Institute.

A moving coil force applier analogous to the driving element or stator of a loudspeaker is provided at the end of the frame opposite the motor 15 and is referred to generally by arrow 10. The stator 10 consists of a bar magnet 20 and closed-end cylindrical iron flux member 21, which is mounted to the frame 11, and defines a radial magnetic field into which extends part of the assembly 8. Bar magnet 20 is provided with a bearing cap 22 which supports the end of bearing spindle 13 as shown.

The assembly 8 in the preferred modification shown consists essentially of sleeve 24 and coil 25. Sleeve 24 is conveniently made out of glass since a smooth inner surface may be easily obtained thus reducing the drag on the spindle 13. The sleeve could be made of other materials such as plastic or metal but it is best if the material be non-magnetic. It has been found that when the accelerometer is used in a fluid such as air a clearance of a few ten thousandths of an inch will give the autolubrication desired. As explained below, the coil 25 is connected to electrical circuitry which when the coil is displaced will cause a current to flow through the coil in the proper direction to give a magnetic force tending to restore the proof mass assembly to its null position. If the assembly 8 is made of a non-magnetic material the only force tending to restore the assembly to its null position is the magnetic force generated by the current in the coil 25 in the radial magnetic field. If part of the assembly 8 were made of a magnetic material such as iron the radial magnetic field which is provided will inherently tend to restore the proof mass to a null position although not as satisfactorily as when the coil 25 is provided. However, such an instrument would tend to be less sensitive as it would always have the error due to the inherent action of the radial field on the iron which would have to be discriminated out.

In the preferred modification shown, a capacitive pick-off means 26 is provided to connect the assembly to the output means described below and to control the output circuitry as a function of the displacement of the assembly 8. Although a capacitive type pick-off means is shown and will be described, naturally any other means of measuring displacement such as an A.-C. pick-off or a "magnesyn" type of pick-off as in the U.S. Patent 2,441,869 could be used. In the case of these latter type pickoffs, the output means is connected to the assembly by the magnetic field between them. The capacitive pick-off means includes movable pick-off plate 27 and fixed pick-off plate 28. Plate 27 is mounted upon the sleeve 24 of assembly 8 and slides with the assembly 8 upon the auto-lubricating bearing provided by the rotation of the spindle 13. Fixed pick-off plate 28 is mounted to journal 12 on insulation plate 29. With this construction it is seen that any movement of the assembly 8 will vary the capacitance between the pick-off plates 27 and 28. As explained below, varying the capacitance of the pick-off plates controls the direction and amount of current through the coil 25. A wire 30 is provided connecting the movable pick-off plate 27 with lead wire 32, shown in FIG. 2, which is connected to one side of the coil 25.

Figure 2:
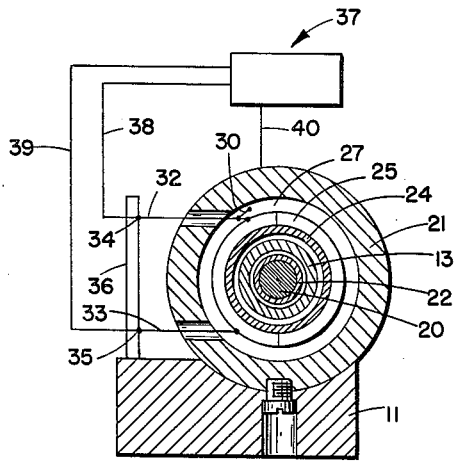
FIG. 2 is a cross-sectional view of the embodiment shown in FIG. 1.

As shown in FIG. 2, lead wire 32 is connected to one side of coil 25 whereas lead wire 33 is connected to the other side of the coil. Each of these lead wires are connected to and extend from the coil 25 at substantially right angles to the axis of the bearing spindle 13. These lead wires 32 and 33 are pivotally mounted at lead wire terminals 34 and 35 on mount 36 respectively. With this arrangement used in a fluid, the bearing spindle 13 is rotated at a sufficient speed and because of the small gap and smooth adjacent surfaces of the sleeve 24 and the spindle 13, an autolubricated fluid bearing is formed. The assembly 8 is restrained from rotating with the spindle 13 by the lead wires 32 and 33 while being allowed to move axially along the bearing spindle a short distance since the lead wires are pivotally mounted as described above and will move through a small arc. Although the lead wires 32 and 33 are used to restrain the assembly 8 from rotating with the spindle 13, it is within the scope of this invention to use other means such as electromagnetic means for restraint.

The pick-off unit box containing the pick-off electrical circuitry is indicated generally by arrow 37. This pick-off unit box is connected to the accelerometer proper by means of wires 38 and 39 to the lead wire terminals 34 and 35 respectively and wire 40 which is connected to the fixed plate 28.

Figure 3:
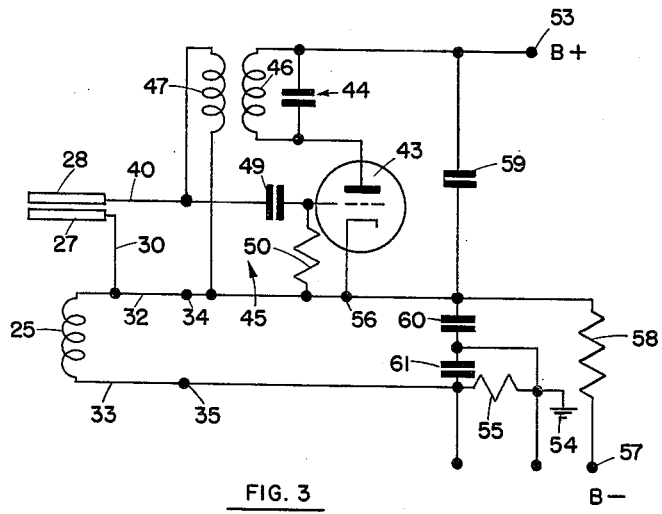
FIG. 3 is an electrical schematic of one possible electrical circuit which will produce an output which is a function of the force measured.

FIG. 3 shows a schematic of one possible system or output means to be used to produce an output which is a function of the force measured. It is essentially an RF oscillator which is a modification of the Colpitts oscillator commonly referred to as the ultra-audion. The oscillator is of the tuned-plate, tuned-grid type and operates in super-regeneration at a primary frequency of approximately 100 megacycles. Due to the D.-C. plate current dip characteristics of the oscillator near resonance of the tuned circuits, it gives a D.-C. output which is proportional to the position of the pick-off plates. The circuit uses a triode 43 which could be a 6F4 triode in conjunction with a plate tank circuit referred to generally as 44 and a grid tank circuit referred to generally as 45. The plate tank coil 46 is inductively coupled to the grid tank coil 47 as shown. Grid leak capacitor 49 is connected to the tube grid, one side of the grid tank coil 47 and grid leak resistor 50 in the normal manner. When the tube is conducting electron current flows from the grid and charges the capacitor 49 with a negative charge being developed on the side connected to the grid. The electrons on the grid flow to and charge the capacitor 49 as the resistor 50 is too large to allow the current to flow through it fast enough. Within a short time the capacitor 49 becomes so negative that the tube is cut off and remains cut off for a short time as the capacitor discharges through the resistor 50. As the capacitor loses its negative charge the grid becomes less negative and the tube will conduct again repeating the cycle. The time it takes for a complete cycle is a direct function of the resistance of resistor 50 multiplied by the capacitance of capacitor 49 in series with the capacitance formed by plates 27 and 28. With this circuit the plate current is not continuous but flows in sharp pulses on the order of one microsecond long as the grid tank circuit quenches the current flow through the tube. As is commonly known, with this type of circuit varying of the capacitance in the grid circuit will increase or decrease the quenching frequency and thereby control the average tube current. More specifically, if the pick-off plates 27 and 28 are moved further apart the quenching cycle becomes more rapid and the average current in the tube rises and vice versa.

When a 6F4 triode is used in the circuit, a B+ voltage of 250 volts at terminal 53 has been found satisfactory. The circuit is grounded at the ground terminal 54 through the precision output resistor 55. Thereby, if the proof mass assembly is moved a first direction from null position, as more specifically pointed out below, the D.-C. portion of the electron flow is from the ground terminal 54 through the precision output resistor 55 through the coil 25 and to the tube cathode at terminal 56. Then the electron flow continues through the tube 43 and the plate tank coil 46 to the B+ voltage 53. As pointed out above, the flow of current through the coil 25 is of such direction that a force in the radial magnetic field is exerted tending to return the assembly 8 to null position. In order that the electron flow through the coil 25 be reversed when assembly 8 has been displaced in the opposite direction to that mentioned above, a B— voltage of 250 volts is supplied at terminal 57 and connected to the cathode terminal 56 through bridging resistor 58. Bypass condensers 59, 60 and 61 are provided as shown in order to bypass the RF frequencies.

In operation, when the force receiving assembly or proof mass assembly 8 is at the null position the quenching frequency is such that the average current flow through the tube is of such proportions that terminal 56 is at ground level and the electron flow is from B— terminal 57 to B+ terminal 53. Resistor 58 is of such size that the potential rise across it is equal to the B— voltage when the assembly is at the above-mentioned null condition to maintain terminal 56 at ground potential. Therefore, there is no current flow through the coil 25 and the output resistor 55. When the acceleration forces move the assembly 8 so the pick-off plates 27 and 28 are moved further apart, as explained above, the quenching frequency increases causing the average tube current to rise and thereby raise the potential of terminal 56 above ground. This causes electron flow from ground terminal 54 through the precision output resistor 55 and the coil 25 in a first direction. As coil 25 is properly wound this current in the radial magnetic field tends to restore the assembly 8 to null position. The amount and direction of this current flow is measured across output precision resistor 55. If the instrument were used as an accelerometer, any suitable means is used to connect the instrument output to a computer which then uses the output to compute the distances traveled or to any other instrument desired. If the pick-off plates 27 and 28 are moved closer together by a force in an opposite direction, the quenching frequency decreases causing the average plate current to be less which lowers the potential at terminal 56 below ground since the voltage does not drop across resistor 58 as much. Although the tube is still conducting, since terminal 56 is now below ground the electron flow now goes through the coil 25 in the opposite direction and then through the precision output resistor 55 to the ground terminal 54. Here, also, as coil 25 is within the radial magnetic field the current flow through the coil 25 in the opposite direction tends to restore the assembly 8 to null position. As explained above, the coil 25 is not absolutely necessary if there is magnetic material in the assembly 8 as the radial magnetic field tends to restore the assembly to its null position. However, with the coil 25 in the circuit it is seen that the unit may be used to handle larger forces since the current flow in the coil 25 is always of a direction which generates in the magnetic field a force tending to return the assembly to null position.

The circuit described above has been shown and described as a preferred circuit as its characteristics tend to be more stable in varying operating conditions such as temperature changes. However, other circuits can be used such as providing a crystal type oscillator and having the pick-off plates 27 and 28 connected in the tube plate tank circuit. Such a circuit is simpler but less stable. Also, as mentioned above, a completely different means of picking off the position of the assembly 8 on the spindle 13 with a different circuit could be used.

Figure 4:
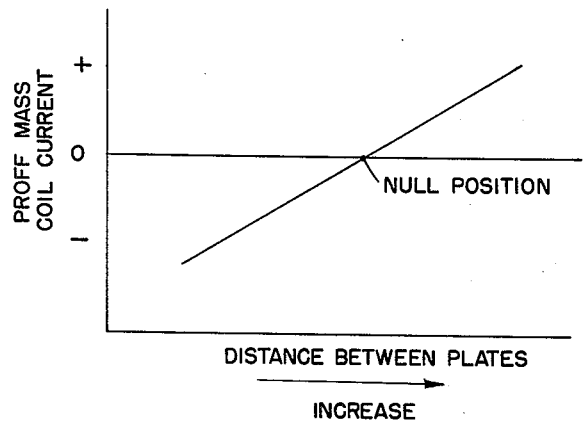
FIG. 4 shows a curve illustrating how the displacement of the pickoff plate varies the amount and direction of current in the proof mass coil.

FIG. 4 illustrates how, as the distance between the pick-off plates is increased or decreased, the current through the coil 25 is varied. If the plates 27 and 28 are displaced further apart from the null position the current will flow in one direction and the flow will increase as the plates are further displaced. Conversely, the figure also illustrates how the current flow through the coil 25 is in the opposite direction and increases negatively as the plates 27 and 28 are brought closer together.

Figure 5:
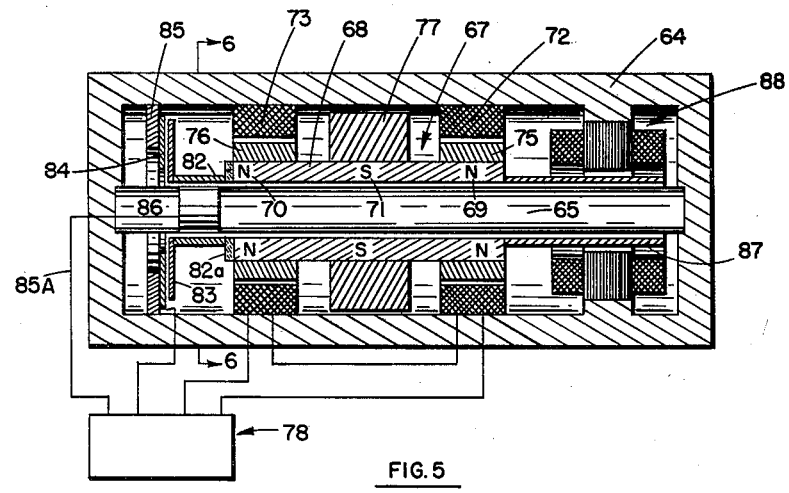
FIG. 5 shows a sectional view of a second embodiment of the instrument.

FIG. 5 shows a sectional view of another modification of the force measuring instrument which may be used with the electrical circuitry described above. This latter modification has the advantage that the force receiving unit is supported on a bearing spindle and does not require lead wires similar to lead wires 32 and 33 described above. The instrument is generally contained within cylindrical housing or frame 64 which has been made of iron. A housing of such a ferromagnetic material has the advantage that any disturbances in the magnetic field outside the instrument are minimized; however, the housing 64 may be made of any material rigid enough to give support for the elements mounted in it. If it is not made of a magnetic material, an insert of material of the nature of soft iron should be provided to provide a low reluctance path for the magnetic field described below. Bearing shaft or spindle 65 is mounted within housing 64 and is made of graphite coated glass as above for ease of construction. The force receiving or force measured unit 67 is composed mainly of tubular magnet 68 which has been magnetized with the north poles 69 and 70 at either end and south pole 71 in the center. As in the first embodiment, when the instrument is used in a fluid such as air a clearance of a few ten thousandths is satisfactory for the autolubricated bearing characteristics desired.

In order that a force be applied to the force receiving unit in a direction opposite to that which the force measured is applied, electromagnetic coils 72 and 73 encircle the north poles 69 and 70 respectively. The flow of magnetic flux is concentrated by providing iron pole pieces 75 and 76 which are mounted to and encircle the north poles 69 and 70 of the tubular magnet 68 and are of such dimension that the air gap between the magnetic coils and the iron pieces is very small to reduce the reluctance of the flux path. Iron pole piece 77 is provided encircling south pole 71 and is also of such dimension that only a very small air gap is left between the iron pole piece 77 and the housing 64. Thereby there is a flux path from the magnet 68 through the north poles and their adjacent iron pole pieces through the coils 72 and 73, through the housing 64 and back to the magnet 68 through iron pole piece 77.

As in the above mentioned modification, the electromagnetic coils 72 and 73 are connected to the pickoff unit box indicated generally by arrow 78 in such a manner that electrical current flows through the coils in a proper direction to exert a magnetic force on the tubular magnet 68 in a direction opposite to which the force which is measured has moved the force receiving unit 67.

As in the above modification, a capacitive type pickoff is provided to connect the unit 67 with the output circuitry and control the amount and direction of the flow of current through the coils 72 and 73. Sleeve 82 is provided on ceramic insulation ring 82a which is mounted at pole 70 as shown, and has a first movable capacitor plate 83 mounted at the end of the sleeve 82 away from the pole 70. In close proximity to capacitor plate 83 a second fixed capacitor plate 84 is provided, mounted on the insulation ring 85 which is secured to the housing 64. Naturally the ring 85 could be a disc which is mounted on the bearing spindle 65. The capacitor plate 84 is connected to the pickoff unit box 78 as shown. The movable capacitor plate 83 is connected to the pickoff unit box 78 by means of the wire 85A connected to the capacitor sleeve 86 which is embedded in the bearing spindle 65 and forms a capacitor with sleeve 82 which will conduct an A.-C. signal.

In order to cause relative rotation between the force receiving unit 67 and the bearing spindle 65 and effect an autolubricated bearing as described in more detailed in connection with the first modification, a polyphased motor stator 88 is provided surrounding the conductive sleeve 87 which is mounted to the magnet 68 at north pole 69. This sleeve should be conductive and could be made of aluminum, magnesium or any other similar material.

As is commonly known in the electrical motor art, if a rotating field is provided around a conductive material which is free to rotate, that material will rotate with the field as any induction motor. The FIG. 5 shows that the sleeve 87 extends to the right beyond the stator to minimize end effects and axial coercion. As with the first modification, if the force measuring instrument were used in a fluid such as gas, an autolubricated fluid bearing capable of withstanding a load of 8 or 10 gravities is formed between the force receiving unit 67 and the bearing spindle 65 when the force receiving unit is rotated relative to the spindle at from 4000 to 5000 r.p.m. Similarly, if the viscosity of the fluid in which the instrument were used were higher as when the instrument is used in oil, the speed of the relative rotation between the force receiving unit 67 and the spindle 65 could be reduced.

Figure 9:
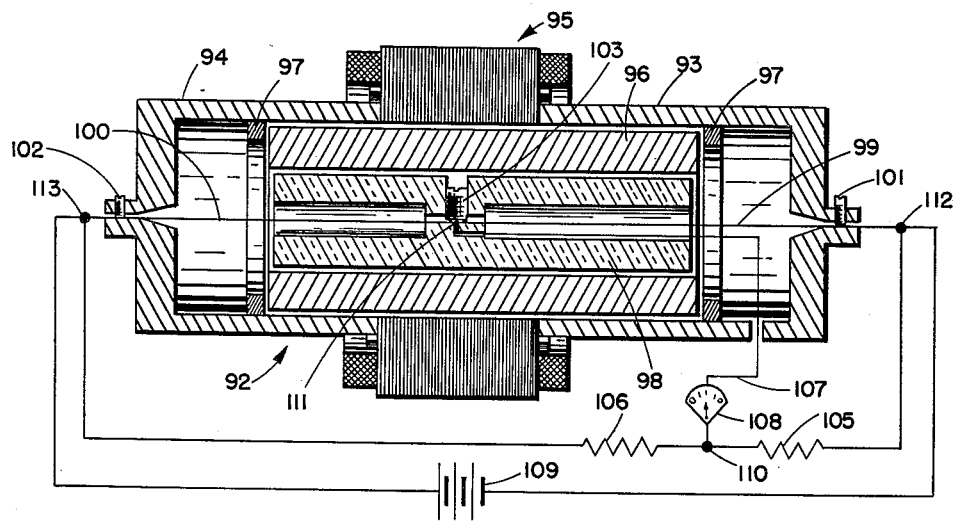
FIG. 9 shows a sectional view of a third embodiment of the instrument.

While in both the first and second modifications the force receiving assembly or unit is provided on the outside of the bearing spindle which constrains it to lineal motion, it should be appreciated that with the present modification if the spindle 65 were a hollow cylinder the force receiving unit could be mounted within the cylinder. In this case the force receiving unit could still be rotated relative to the cylinder by the rotating magnetic field of motor stator 88 as the magnetic field would pass through the glass used in the bearing spindle 65. Such a modification has the inherent disadvantage that the magnetic flux which tends to restore the force receiving unit to its normal position would have to pass through the glass also. Further, it is within the scope of the invention that the force measured receiving assembly be located within a tube which is rotated relative to the assembly to form the desired autolubricated bearing as shown in FIG. 9.

Figure 6:
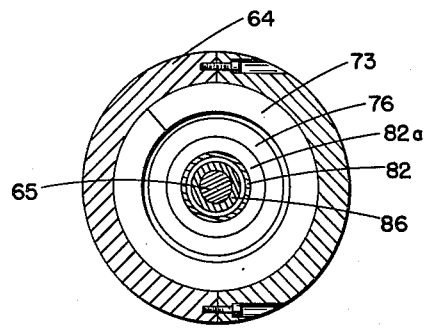
FIG. 6 shows a cross-sectional view of the embodiment of the instrument shown in FIG. 5.

FIG. 6 shows a cross-sectional view of the second embodiment described above along lines 6—6. This view shows how the elements are all generally cylindrical to allow the rotation of the force receiving unit with maximum efficiency. However, all of the parts, and particularly the housing or frame 64, could have other cross-sectional shapes without deviating from the spirit of the invention.

Figure 7:
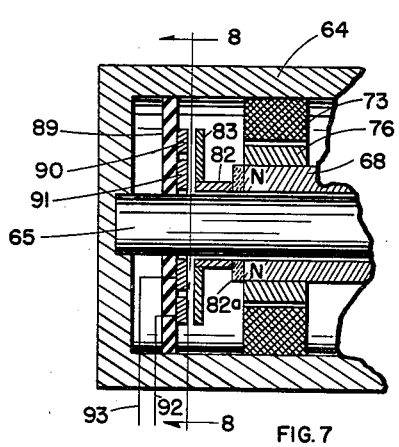
FIG. 7 shows a partial sectional view of the instrument shown in FIG. 5 with another type of capacitive pickoff.

FIG. 7 shows a sectional view of another modification of capacitive pickoff which can be used. It is particularly useful with the second embodiment which is described above as it does not require that a capacitor sleeve similar to 86 be embedded in the glass spindle 65. As shown, an insulation mounting taking the form of a disc 89 is mounted within the housing 64. Opposed to first capacitor plate 83, a second capacitor ring 90 and a third capacitor ring 91 are provided on insulation disc 89. These capacitor rings are connected to the pickoff unit box 78 through lead wires 92 and 93. With this modification, if the force receiving unit 67 is moved towards the second and third capacitor rings, the first capacitor plate 83 moves towards the second and third capacitor rings 90 and 91 respectively. Varying the distance of the first capacitor plate from the second and third capacitor rings has the effect of varying the capacitance between the second and third capacitor rings 90 and 91. As in the first embodiment, varying the capacitance in the pickoff controls the pickoff electrical circuitry within the pickoff unit 78 which gives an output as a function of the force measured and produces a current of proper magnitude and direction through the coils 72 and 73. This current generates a magnetic force tending to restore the force receiving unit to its null position.

Figure 8:
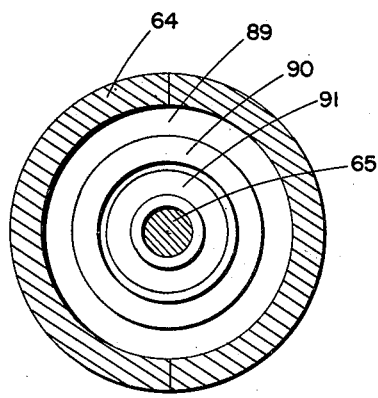
FIG. 8 is a cross-sectional view of the pickoff shown in FIG. 7 taken as indicated by line 8—8 in that figure.

FIG. 8 is a cross-sectional view of the above described modification along line 8—8 and shows how the second and third capacitor rings 90 and 91 are mounted on the insulation member 89. The capacitor rings 90 and 91 are shown as being circular, but they could be of other shapes such as rectangles and not even concentric without affecting their ability to measure the displacement of the force receiving unit 67.

FIG. 9 shows another modification of the present invention in which the force receiving unit is located within a rotating bearing member. The main portion of the instrument is contained within the housing or frame referred to generally by arrow 92. In this modification the frame 92 consists of two sections 93 and 94 which are mounted to the polyphase stator 95 in some means such as bolts as shown. A bearing member 96 is mounted within the housing 92 and has a generally cylindrical outer surface of slightly smaller diameter than the inside diameter of the housing so that it may be rotated relative to the housing 92 by the stator 95 as described below. Bearing member 96 is formed with a cylindrical aperture therein. Guide rings 97 are mounted to the housing 92 and are spaced a small distance from member 96 in order to restrain the bearing member 96 from moving longitudinally in the housing while it is rotating. The stator 95 provides a means for causing rotation of the bearing member by inductive action in the same manner as described in the second modification of the invention shown in FIG. 5. Here, as in that modification, the bearing member 96 is made of some conductive material such as aluminum or steel in which eddy currents are generated by the rotating field within the stator 95, thus causing rotation of member 96. A force receiving unit or proof mass member 98 is rotatably mounted within said bearing member 96 and is also translationally slidable within said member 96. This unit 98 has a cylindrical outer surface of a diameter which is in the order of a few ten thousandths of an inch smaller than said aperture diameter of member 96 when the instrument is used in air. Two strain gage wires 99 and 100 are provided each having a predetermined operative length between terminal 111 and the set screws 101 and 102, respectively. These strain gage wires have the function of tending to retain the assembly in the null position while restraining the assembly from rotating with member 96, and are part of the circuit which produces an output which is a function of the force measured. One end of the operative length of each of these wires 99 and 100 is connected together forming terminal 111 as shown. Any suitable means such as set screw 103 is used to connect or fix the terminal 111 and consequently the gage wires 99 and 100 relative to the unit 98. Here the output means are mechanically connected to the force receiving unit, but if other type pickoffs were used such as suggested above, the connection would be magnetic. The wires extend in opposite directions from the unit 98 along the axis of the translational sliding motion of the assembly and have the opposite ends of their operative length mounted to the housing by any suitable means such as set screws 101 and 102.

Both strain gage wires 99 and 100 have a predetermined pull on them so that both wires are slightly stretched when the instrument is in the null condition. Thereby when a force is applied to the unit 98 as described in more detail below, the assembly is moved until the appropriate strain gage wire is stretched enough to pull on the assembly enough to balance the force applied and the pull of the other strain gage wire. The length of the other strain gage wire will decrease as the assembly moves as the wire was initially stretched as mentioned above. As is commonly known in the art further stretching of a strain gage wire increases its resistance and conversely reducing the amount that a strain gage wire is stretched will decrease its resistance. This phenomenon is used in the output circuitry described below.

As with the other modifications, output means are provided which will produce an output which is a function of the force measured by the unit 98. The circuitry involved here is very similar to the common Wheatstone bridge with the strain gage wires 99 and 100 forming two legs of the bridge and resistors 105 and 106 forming the other two legs of the bridge. The legs are joined at terminals 110 and 111 as shown by means of connecting wire 107 which has a galvanometer 108 connected in it. Battery 109 is connected to the terminals 112 and 113 which join the legs of the bridge having the strain gage wires 99 and 100 with the legs of the bridge having the resistors 105 and 106 respectively as shown. The respective resistances of the four legs of the circuit are of such value that when the assembly 98 is in the null or rest position, there is no current flow through galvanometer 108.

In operation the stator 95 rotates the bearing member 96 by induction at a speed which is determined by the fluid in which the instrument is used. Since the outside diameter of the unit 98 is only slightly smaller than the cylindrical aperture in the bearing member 96 and since the strain gage wires 99 and 100 restrain the assembly 98 from rotating with the bearing member 96, a hydrodynamic fluid bearing is formed between the member and the assembly which will allow the assembly to move only translationally.

To describe the operation of the output circuit, assume that a force is applied to the force receiving unit 98 in a direction from right to left. It is seen that since the fluid bearing provides only radial support for the unit 98, a virtually frictionless guide for translatory motion is provided for unit 98. The strain gage wire 99 will be stretched by the applied force as the wire is the only means tending to restrain the motion of the unit 98 to the left. Strain gage wire 100 will tend to shorten as the unit 98 moves to the left since the wire 100 is under the initial tension mentioned above. Since the circuit was initially balanced so that there is no current flowing through the galvanometer 108 when the assumed force stretches strain gage wire 99 increasing its resistance and allows wire 100 to shorten by its elasticity, thereby decreasing its resistance, the circuit becomes out of balance. Galvanometer 108 will sense this out of balance condition which is a function of the force applied.

It should be appreciated that the invention is applicable to any apparatus for providing a force measuring instrument which will discriminate and measure forces along one axis and, although only a few forms of the invention have been shown and described, it will be apparent to those skilled in the art that the invention is not so limited but that various modifications may be made therein without deviating from the spirit of the invention or the scope of the appended claims:

I claim:

1. An instrument for measuring forces comprising a frame, a force receiving element, bearing means mounted on said frame having said force receiving element mounted thereon, said force receiving element and bearing means being immersed in a fluid, rotational means for rotating said bearing means relative to said force receiving element, said bearing means, force receiving element and said fluid forming a hydrodynamic rotating fluid bearing for constraining said force receiving element to translational motion along a single axis while permitting free relative rotation with said bearing member, output means connected to said force receiving element adapted to produce a measured output which is a function of the force received, said output means including means to generate a correcting force on said force receiving element in a direction opposite to the direction of the force received and measured by the instrument.

2. An instrument for measuring forces along a single axis, comprising a frame, a journal member mounted on said frame, a spindle member mounted for rotation within said journal member, a cylindrical member located substantially concentrically to said spindle member and rotational thereabout and translational therealong, said cylindrical member being a force receiving member, and means producing an output which is a function of the force measured, said cylindrical member being rotatably and slidably mounted relative to said spindle, means to rotate said last two mentioned members through more than 360° relative to each other, resilient means for positively restraining rotation of one of the said last two mentioned members relative to said frame while permitting translation along a single axis, said instrument being immersed in a fluid whereby the rotation of one relative to the other of said last two mentioned members forms a hydrodynamic fluid bearing therebetween.

3. An autolubricated force measuring instrument comprising a frame, a bearing spindle mounted on said frame, a force receiving assembly slidably and rotatably mounted substantially concentric with said bearing spindle, said spindle constraining the direction of the sliding motion of said assembly along a single axis, means producing an output which is a function of the force received, means for causing substantially continuous relative rotation between said spindle and said assembly, means for positively limiting the rotation of said assembly relative to said frame, said assembly and spindle being immersed in a fluid whereby the relative rotation therebetween forms a hydrodynamic fluid bearing between said assembly and spindle.

4. An autolubricating instrument for measuring translational forces comprising a frame, a bearing member mounted on said frame, a force receiving assembly slidably and rotatably mounted on said bearing member, said member constraining to translation along a single axis the direction of the sliding motion of said assembly, means for producing an output which is a function of the force received, means for positively limiting the rotation of said assembly relative to said frame, means for causing substantially continuous relative rotation between said member and said assembly, said instrument being immersed in a fluid whereby the relative rotation between the assembly and the member forms a hydrodynamic fluid radial support bearing between said assembly and member.

5. An autolubricating accelerometer comprising a frame, a supporting bearing member mounted on said frame, a second bearing member mounted for rotation relative to said supporting bearing member, a proof mass assembly slidably and rotatably mounted relative to said second bearing member, said members constraining to a single translational axis relative to said frame, the direction of the sliding motion of said proof mass assembly, electrical means producing an output as a function of the acceleration force acting along said translational axis, said electrical means comprising means for generating a force on said proof mass assembly in the opposite direction to the force acting along said translational axis and tending to restore said assembly to a null position, means for causing relative rotation between said second bearing member and each of said proof mass assembly and supporting bearing member, said proof mass assembly, said proof mass, second bearing member and supporting bearing member being immersed in a fluid whereby the rotation of the second bearing member relative to the proof mass assembly and the supporting bearing member forms hydrodynamic fluid bearing supports therebetween.

6. A force measuring instrument comprising a frame, a rotatable bearing spindle mounted on said frame, means to rotate said spindle, a force receiving element rotatably and slidably mounted for translation along a single axis on said spindle, positive means to prevent said element from rotating relative to said frame as rapidly as said spindle, and measuring means producing an output which is a function of the force received, said instrument being immersed in a fluid, whereby rotation of said spindle relative to said force receiving element forms a hydrodynamic fluid bearing between said spindle and element.

7. An autolubricating accelerometer comprising a frame, a journal member mounted on said frame, a spindle member mounted for rotation within said journal member, means to rotate said spindle, a proof mass rotatably and slidably mounted on said spindle, means to prevent said proof mass from rotating relative to said frame, and means for producing a displacement signal in response to translations only of said proof mass relative to said spindle which is a function of the acceleration force measured, said proof mass and bearing spindle being immersed in a fluid, whereby rotation of said spindle relative to said proof mass forms a hydrodynamic fluid bearing therebetween.

8. An autolubricating accelerometer comprising a frame, magnetic field means adapted to be mounted on said frame, a rotatable bearing spindle mounted on said frame adjacent said magnetic field means, means to rotate said spindle, a proof mass assembly having a coil winding at least part of which is within the field of said magnetic field means, said proof mass being rotatably and slidably mounted on said spindle, means to restrain said proof mass from rotating through more than a small arc on said spindle while permitting relatively free displacement axially thereof, pickoff means associated with said frame, and electrical circuit means connected thereto to measure the axial displacement of said proof mass from its null position, output means adapted to produce an output signal as a function of such displacement, said proof mass and spindle being immersed in a fluid whereby said relative rotation of said spindle and said proof mass forms a hydrodynamic fluid bearing therebetween, and means for utilizing variations in said output signal to change the strength of said magnetic field in a direction such as to restore said proof mass assembly to null position.

9. An accelerometer comprising a frame, magnetic field means mounted on said frame providing a generally radial magnetic field, a rotatable bearing spindle mounted on said frame with its longitudinal axis substantially perpendicular to the plane of said magnetic field, one end of said spindle being located within said field, a proof mass assembly slidably and rotatably mounted axially of said bearing spindle, means to rotate said bearing spindle relative to said assembly, said proof mass assembly including a coil located within said magnetic field, at least one proof mass lead wire connected to and extending from said coil at substantially right angles to the axis of said bearing spindle but adapted to prevent rotation of said coil relative to said frame, and said lead wire being mounted flexibly on said frame, pickoff electrical circuit means, pickoff means located adjacent said bearing spindle and proof mass assembly for detecting deflection of said assembly on said spindle from a null position and controlling said pickoff electrical circuit means in response thereto, said electrical means being controlled to cause current to flow through said coil, when said coil is displaced from its null position, in a direction which will tend to restore said proof mass assembly to its null position; said accelerometer being immersed in a fluid whereby said rotation of said spindle relative to said assembly forms a hydrodynamic fluid bearing between said spindle and assembly.

10. The invention as claimed in claim 8 wherein said pickoff means comprises a first capacitor plate fixed relative to said frame, a second capacitor plate mounted on said proof mass assembly juxtaposed to said first plate, and electrical circuit means connected to said first and second plates and to said coil.

11. A force measuring instrument comprising a frame, output means which produce an output as a function of the force measured, a bearing shaft mounted on said frame, a force receiving assembly rotatably mounted on said shaft, said assembly including a tubular magnet and at least part of said first mentioned means, magnetic coil means mounted on said frame and encircling said tubular magnet for exerting a magnetic force on the force receiving assembly in the opposite direction of the force measured, said output means including electrical means for controlling the direction and the magnitude of the current through said coil means as a function of the force measured, means to rotate the force receiving assembly relative to the bearing shaft, said instrument being immersed in a fluid whereby the relative rotation of said force receiving assembly and the bearing shaft forms a hydrodynamic fluid bearing between said assembly and shaft.

12. The force measuring unit as claimed in claim 5 wherein said output means comprises electrical circuit means having a first capacitor plate mounted on said proof mass assembly and a second capacitor plate fixed relative to said frame whereby movement of said proof mass assembly changes the capacitance between said first and second plates to vary the response of said electrical circuit means.

13. The force measuring instrument as claimed in claim 5 wherein said output means comprises electrical circuit means having a first capacitor plate mounted on said proof mass assembly, and second and third fixed capacitor rings mounted on said frame juxtaposed to said first capacitor plate and insulated from each other, said electrical circuit means being connected to said second and third capacitor rings whereby movement of the proof mass assembly changes the capacitance between said second and third capacitor rings, thereby controlling the output of said electrical means.

14. An autolubricating force measuring instrument comprising a frame, a bearing member fixedly mounted on said frame, said member being formed with a cylindrical aperture, a spindle bearing member rotatably mounted within said cylindrical aperture, a force receiving proof mass unit mounted for relative rotation on and translationally slidable along said spindle bearing member, but positively restrained against rotation relative to said frame, output means connected to said unit producing an electrical output which is a function of the force received, the elements supported by said frame being immersed in a fluid, means for rotating said spindle bearing member relative to said unit whereby rotation of said spindle member relative to said proof mass unit forms a hydrodynamic fluid bearing between said member and said unit.

15. The invention as claimed in claim 14 wherein said output means comprises two strain gage wires each having a predetermined operative length, one end of said operative length of each of said wires connected to said force receiving unit, said wires extending in opposite directions from said unit along the axis of said bearing, the opposite end of the operative length of each of said wires fixed to said frame whereby the force on said unit in one direction along the axis of said bearing will stretch one of said wires and shorten the other of said wires.

16. An instrument for measuring forces, comprising: a frame; a force receiving element; autolubricated self pressurizing bearing means provided between said frame and said force receiving element allowing translational deflection thereof; said bearing means comprising a bearing member adapted for relative rotational movement with respect to said force receiving element about the direction of translation of said element, rotational means for rotating said bearing member relative to said element said autolubricated self pressurizing bearing being generated by the relative rotation between said force receiving element and said bearing member; pickoff means for detecting said translational movement of said force receiving element; and means responsive to said pickoff means for maintaining said force receiving element substantially undeflected.

17. An instrument for measuring forces, comprising a frame; a force receiving element having a cylindrical surface; a cylindrical bearing element fixed to said frame and having a radius differing sufficiently from that of said force receiving element to define a narrow annular gap therebetween and adapted to have said force receiving element mounted thereon, said force receiving element and bearing element being immersed in a gas; means for restraining one of said elements against rotation relative to said frame, rotational means for rotating one of said elements relative to the other, whereby said elements and said gas form a hydrodynamic rotating gas bearing for constraining said force receiving element to translational motion along a single axis while permitting free relative rotation with said bearing element; and output means connected to said force receiving element adapted to produce a measured output which is a function of the force received; said output means including means to generate a correcting force on said force receiving element in a direction opposite to the direction of the force received and to be measured by said instrument.

18. An accelerometer for detecting and measuring acceleration along a defined axis comprising a rotating shaft having an axis of rotation along said defined axis; a mass supported on said rotating shaft; an air bearing between said mass and said rotating shaft; means restricting the movement of the mass uopn said rotating shaft to displacements along the sensitive axis only; and means for measuring the displacement of said mass aong said defined axis.

References Cited in the file of this patent

UNITED STATES PATENTS

| | | |
|---|---|---|
| 2,075,968 | Von Heydekampf | Apr. 6, 1937 |
| 2,472,829 | Hoppmann | June 14, 1949 |
| 2,573,285 | Statham | Oct. 30, 1951 |
| 2,591,921 | Cosgriff et al. | Apr. 8, 1952 |
| 2,606,310 | Baker | Aug. 5, 1952 |
| 2,650,815 | Feilden et al. | Sept. 1, 1953 |
| 2,667,345 | Dale | Jan. 26, 1954 |
| 2,697,594 | Stanton | Dec. 21, 1954 |
| 2,752,466 | Bonnell | June 26, 1956 |
| 2,764,658 | Statham | Sept. 25, 1956 |
| 2,780,101 | Kinkel | Feb. 5, 1957 |
| 2,797,912 | Trostler | July 2, 1957 |
| 2,831,670 | Bourns et al. | Apr. 22, 1958 |
| 2,840,366 | Wing | June 24, 1958 |
| 2,869,851 | Sedgfield | Jan. 20, 1959 |
| 2,948,152 | Meyer | Aug. 9, 1960 |

FOREIGN PATENTS

| | | |
|---|---|---|
| 729,894 | Germany | Dec. 19, 1942 |